(12) United States Patent
Thibadeau et al.

(10) Patent No.: US 8,127,075 B2
(45) Date of Patent: Feb. 28, 2012

(54) NON-LINEAR STOCHASTIC PROCESSING STORAGE DEVICE

(75) Inventors: Robert Harwell Thibadeau, Pittsburgh, PA (US); Kevin Arthur Gomez, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 744 days.

(21) Appl. No.: 11/780,564

(22) Filed: Jul. 20, 2007

(65) Prior Publication Data

US 2009/0024816 A1 Jan. 22, 2009

(51) Int. Cl.
*G06F 17/12* (2006.01)
*G06F 7/36* (2006.01)

(52) U.S. Cl. ............... 711/112; 711/154; 711/E12.016; 706/28

(58) Field of Classification Search .................. 711/154, 711/E12.016, 112; 706/25, 26, 27, 908
See application file for complete search history.

(56) References Cited

U.S. PATENT DOCUMENTS

| | | | |
|---|---|---|---|
| 4,972,363 A | | 11/1990 | Nguyen et al. |
| 5,335,117 A | * | 8/1994 | Park et al. ................. 360/48 |
| 5,359,700 A | | 10/1994 | Seligson |
| 5,410,716 A | | 4/1995 | Mitterauer |
| 5,532,938 A | | 7/1996 | Kondo et al. |
| 5,590,243 A | | 12/1996 | Akimoto et al. |
| 5,621,862 A | | 4/1997 | Nakahira et al. |
| 5,732,697 A | | 3/1998 | Zhang et al. |
| 5,822,742 A | * | 10/1998 | Alkon et al. ................. 706/31 |
| 6,052,679 A | | 4/2000 | Aparicio, IV et al. |
| 6,199,057 B1 | | 3/2001 | Tawel |
| 6,792,413 B2 | | 9/2004 | Tani |
| 6,918,014 B1 | * | 7/2005 | Borrill ......................... 711/147 |
| 7,107,107 B2 | | 9/2006 | Morikawa et al. |
| 7,320,069 B1 | * | 1/2008 | Sundharraj et al. ........... 713/153 |
| 7,403,890 B2 | * | 7/2008 | Roushar ......................... 704/9 |
| 2003/0065409 A1 | | 4/2003 | Raeth et al. |
| 2003/0115164 A1 | * | 6/2003 | Jeng et al. ..................... 706/15 |
| 2003/0159568 A1 | * | 8/2003 | Kemmochi et al. ........... 84/626 |
| 2004/0039555 A1 | | 2/2004 | Ulyanov et al. |

(Continued)

FOREIGN PATENT DOCUMENTS

| | | |
|---|---|---|
| JP | 08-022446 A | 1/1996 |
| JP | 09-245011 A | 9/1997 |
| JP | 2002-117389 A | 4/2002 |

OTHER PUBLICATIONS

Muntz et al., "A Parallel Disk Storage System for Realtime Multimedia Applications," International Journal of Intelligent Systems, special issue on Multimedia Computing Systems, 1998.*

(Continued)

*Primary Examiner* — Hal Schnee
(74) *Attorney, Agent, or Firm* — Robert P. Lenart, Esq.; Pietragallo Gordon Alfano Bosick & Raspanti, LLP

(57) ABSTRACT

A storage device includes an interface for receiving and outputting messages for processing data units, wherein each data unit includes message input field parameters, message output field parameters, and content field parameters, a non-volatile memory for storing data units, a volatile memory, and a processor coupled to the interface, the non-volatile memory and the volatile memory, for manipulation of the parameter values in the data units, and storing the data units in at least one of the non-volatile memory and the volatile memory.

21 Claims, 8 Drawing Sheets

U.S. PATENT DOCUMENTS

| | | | |
|---|---|---|---|
| 2004/0199372 A1* | 10/2004 | Penn | 703/22 |
| 2004/0205035 A1* | 10/2004 | Rimoux | 706/14 |
| 2005/0086186 A1* | 4/2005 | Sullivan et al. | 706/16 |
| 2006/0079982 A1* | 4/2006 | Giebels et al. | 700/99 |
| 2006/0117046 A1* | 6/2006 | Robertson et al. | 707/101 |
| 2006/0184462 A1 | 8/2006 | Hawkins | |
| 2006/0256130 A1* | 11/2006 | Gonzalez | 345/619 |
| 2006/0282236 A1 | 12/2006 | Wistmuller | |
| 2007/0011118 A1* | 1/2007 | Snook et al. | 706/16 |
| 2007/0030792 A1* | 2/2007 | Chen | 369/214 |
| 2007/0165669 A1* | 7/2007 | Kasperovich | 370/467 |
| 2007/0288407 A1* | 12/2007 | Nishimoto et al. | 706/16 |
| 2008/0016321 A1* | 1/2008 | Pennock et al. | 712/35 |
| 2008/0140749 A1* | 6/2008 | Amato et al. | 708/490 |
| 2008/0195631 A1* | 8/2008 | Dom et al. | 707/10 |
| 2008/0201389 A1* | 8/2008 | Cohen et al. | 707/203 |

OTHER PUBLICATIONS

Lahdelma et al., "Stochastic multicriteria acceptability analysis using the data envelopment model," Risto Lahdelma and Pekka Salminen, European Journal of Operational Research 170 (2006), pp. 241-252, Available online Sep. 15, 2004.*

Clarkson et al., "Applications of the pRAM," IEEE Joint Conference on Neural Networks, 1991, pp. 2618-2623 vol. 3.*

R. H. Thibadeau, "Memory for Active Sentences", A Thesis Presented to the Graduate Faculty of the Univerity of Virginia, Aug. 1973, 99 pgs.

H. A. Rollins et al., "The Effects of Auditory Shadowing on Recognition of Information Received Visually", Memory & Cognition, vol. 1, No. 2, 1973, pp. 164-168.

L. S. Reid, "Toward a Grammar of the Image", Psychological Bulletin, vol. 81, No. 6, 1974, pp. 319-334.

R. H. Thibadeau, "The Formation of Casual Relations Connecting Sentences in Comprehension and Memory", A Dissertation Presented to the Graduate Faculty of the University of Virginia, Aug. 1976, 187 pgs.

R. Thibadeau, "Artificial Perception of Actions", Cognitive Science, vol. 10, 1986, pp. 117-149.

* cited by examiner

NON-LINEAR STOCHASTIC PROCESSING STORAGE DEVICE

BACKGROUND

Conventional data storage devices are highly suited to the precise storage and retrieval needs of digital computing, and have the attribute that bits of data are stored and retrieved as perfectly as possible. The data is stored in a form conducive to manipulation by a file system, a system of tables, or object associated bytes. Intelligent drives attempt to move properties of a computing system into the storage device, but do not fundamentally change the nature of permanent, non-volatile, storage devices of which the most common examples today are disc drives and flash memory devices.

It has been apparent to many researchers for scores of years that to have a practical inductive reasoning device, massive non-linear stochastic processing computation is required. This requires an enormous amount of memory or non-volatile storage space for the parameters stored in a large number of data units. There have been several successful efforts to date in scaling up to large parameter stochastic processing networks, on the order of millions of data units. Some of the efforts have employed top of the line supercomputers. But scaling up to proportions in the millions or hundreds of millions, or even billions is not yet practical.

There is a need for a storage device that performs non-linear stochastic processing computations, and can be connected to other such storage devices if further scale up is required outside the boundary of a single device.

SUMMARY

In one aspect, the invention provides a storage device including an interface for receiving and outputting messages for processing data units, wherein each data unit includes message input field parameters, message output field parameters, and content field parameters, a non-volatile memory for storing data units, a volatile memory, and a processor coupled to the interface, the non-volatile memory and the volatile memory, for manipulation of the parameter values in the data units, and storing the data units in at least one of the non-volatile memory and the volatile memory.

In another aspect, the invention provides a storage device including an interface for receiving and outputting messages for processing data units, wherein each data unit includes message input field parameters, message output field parameters, and content field parameters, a plurality of non-volatile memories for storing data units, a plurality of volatile memories, a plurality of processors, wherein each of the processors is coupled to at least one of the non-volatile memories and to at least one of the volatile memories, for manipulation of the parameter values in the data units, and storing the data units in at least one of the non-volatile memory and the volatile memory, and a scheduling and messaging fabric coupled to the processors.

In another aspect, the invention provides a system including a plurality of storage devices, each including an interface for receiving and outputting messages for processing data units, wherein each data unit includes message input field parameters, message output field parameters, and content field parameters; a non-volatile memory for storing data units; a volatile memory; and a processor coupled to the interface, the non-volatile memory and the volatile memory, for manipulation of the parameter values in the data units, and storing the data units in at least one of the non-volatile memory and the volatile memory, and wherein the storage devices are coupled to each other in a hierarchical message routing structure.

These and various other features and advantages will be apparent from a reading of the following detailed description.

DETAILED DESCRIPTION OF THE INVENTION

In one aspect, this invention provides a storage device that can recognize that it has seen something similar to something it had seen before, or a storage device that can adapt its outputs to its inputs, despite never having recorded those exact inputs or outputs previously. This storage device stores parameters derived from inputs and produces parameters derived from the inputs. In one example, this storage device implements a general platform for non-linear stochastic processing (NLSP) and handles inputs/outputs that are characteristically different from the write/read commands of today's storage devices.

NLSP models of computation are an increasingly important class of machine learning and pattern recognition problems. These computational models are characterized by primarily local, potentially probabilistic, interactions between non-volatile, stored, data units. Examples include training and inference of Bayesian networks and other probabilistic graphical models, training and simulation of artificial neural networks, social network analysis on large datasets, stochastic simulation of spatially distributed systems, and highly-adaptive control systems based on complex feedback. It is well known that these algorithms need to be dramatically scaled up to efficiently process the massive datasets needed for flexible and adaptive recognition and control.

Figure 1:
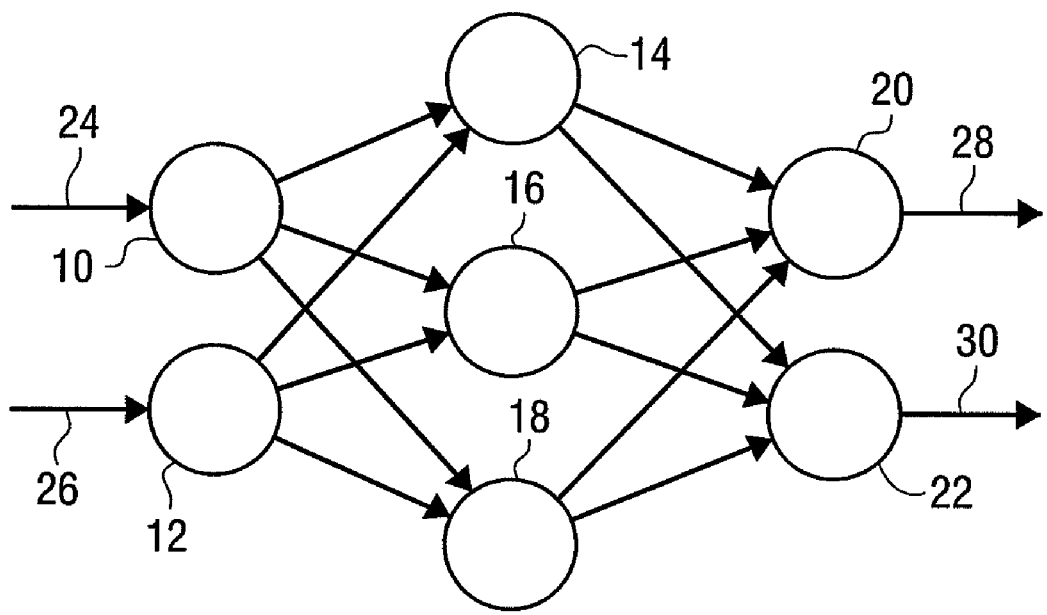
FIG. 1 is a schematic representation of a Hebbian neural network.

Dramatically scaling up NLSP models requires a new type of computer architecture. In one aspect, the present invention achieves the scaling required for NLSP modeling by tightly coupling the simple computations among the NLSP data units with non-volatile storage devices. As one example, consider a simple Hebbian neural network NLSP as illustrated graphically in FIG. 1. In FIG. 1, data units 10, 12, 14, 16, 18, 20 and 22 are processed to yield messages that are sent to other data units according to the arrows. The inputs 24 and 26 are messages and the outputs 28 and 30 are messages as well. Data units 14, 16 and 18 are hidden data units that are not directly coupled to the inputs or outputs.

Figure 2:
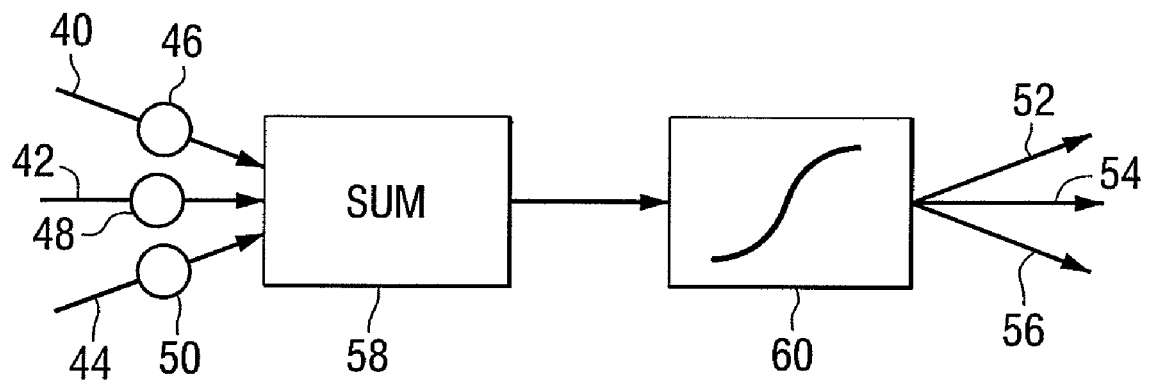
FIG. 2 is a schematic block diagram that illustrates the processing of a data unit.

The processing performed on the data units is illustrated in FIG. 2. In this example a numerical value, called an activation, is what is computed and output to other data units. A plurality of messages 40, 42 and 44 are subjected to weights 46, 48 and 50. Then output values 52, 54 and 56 are computed by performing a weighted sum of the input messages as shown in block 58, and applying a limiting function such as a sigmoid function as shown in block 60. The output messages including the computed value are then sent to other connected data units.

Figure 3:
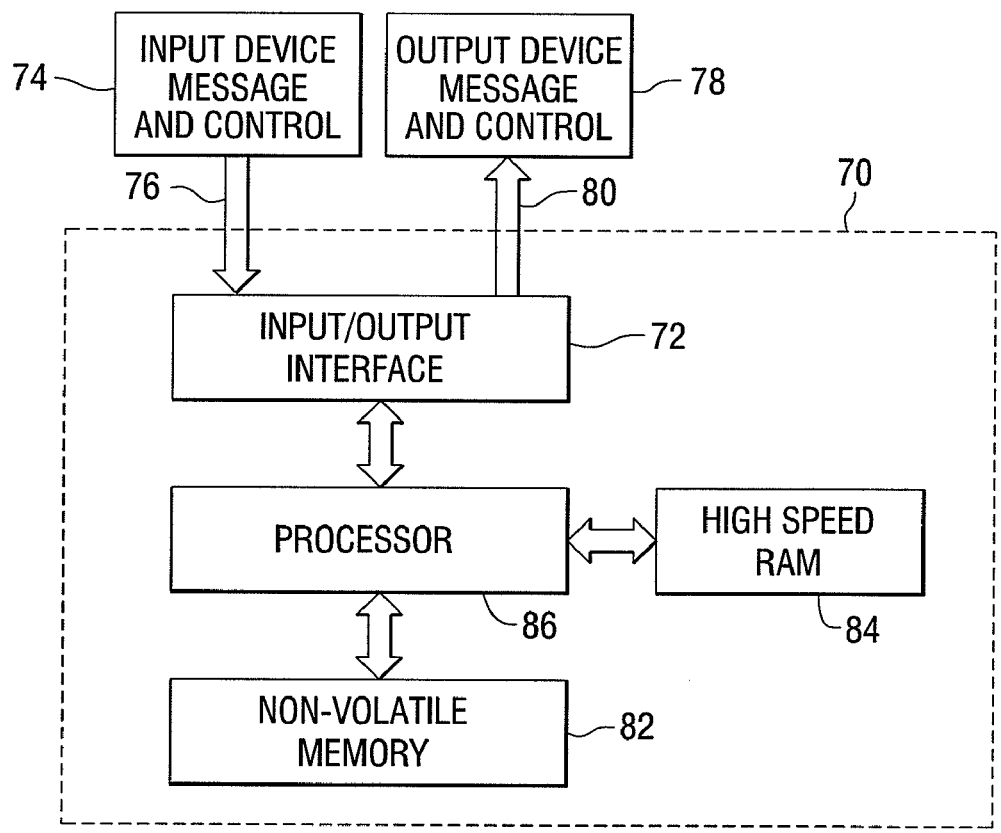
FIG. 3 is a block diagram of an information processing device constructed in accordance with an aspect of the invention.

FIG. 3 is a block diagram of an information processing device 70 constructed in accordance with an aspect of the invention. The apparatus includes an input/output interface 72 for receiving and outputting messages formed by processing data units and control commands. The interface can be, for example, an ATA, SCSI or other peripheral interface, or a computer interface. The control commands allow the device to be initialized, tested and programmed. The control commands also allow for exact data replication as is common in conventional storage devices. In this example, the messages and control commands are supplied by an input device 74 on a bus 76 and the messages and control commands are sent to an output device 78 on a bus 80. The input device encapsulates data unit information in messages and sends the messages to the interface. In another example, the input and output devices could be the same device, and a single bus could be used to transfer the messages and control data. The information processing device 70 includes a first memory component in the form of a non-volatile memory 82. The non-volatile memory provides long term storage of the parameters and programming of the data units. It can include, for example, a magnetic, optical, magneto-optical, or ferroelectric storage media. In those cases, a plurality of transducers would be included in the form of read/write heads that read and write information to the storage media. Alternatively, the non-volatile memory component 82 can be a solid state memory device, or any other type of memory device that provides for long term storage of data units.

The information processing device 70 further includes a second memory component in the form of a volatile higher speed memory 84, such as a high speed random access memory (RAM). A processor 86 is provided for processing the data units in accordance with a desired function. Because the NLSP processing operations are simple, the processor can be implemented as a field programmable gate array (FPGA), which can be programmed to perform the functions on the data units. The processor can read data units from the non-volatile memory or the high speed memory, manipulate parameters in those data units, for example by applying weights to portions of the data units, and write changed values in the processed data units to the non-volatile memory or the high speed memory as appropriate to the particular NLSP computation required. In this example, the processor can also schedule the operations to achieve the desired non-linear stochastic processing functions.

Information is received by, and output from, the information storage device in the form of volatile messages. The messages are stored in the second memory component and processed by the processor. However, if data units that interact with other data units are stored within either the first or second memory component, then the processor may not have to form a message in order to propagate the NLSP computation among those data units. The highest performance propagation may be through data units that are entirely contained within the volatile RAM until input or output of messages through the device interface is required.

Figure 4A:
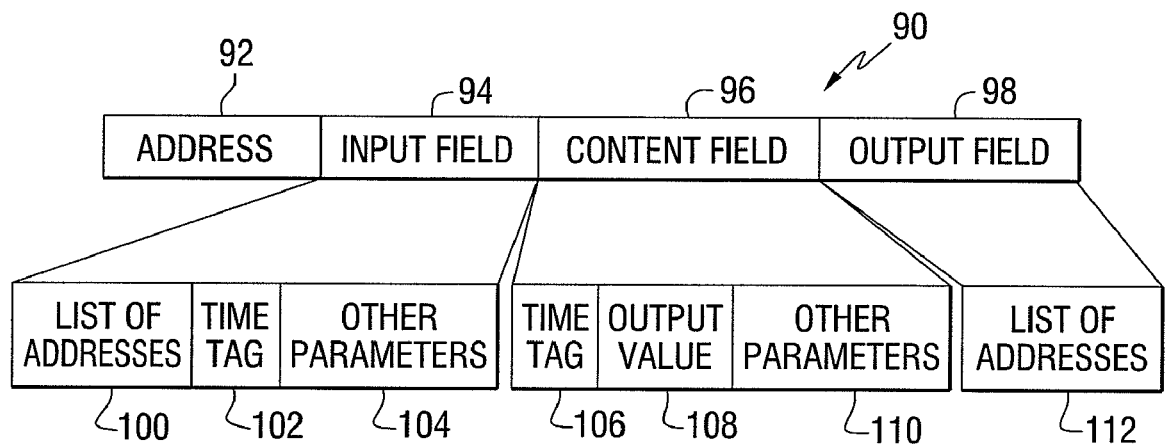
FIG. 4a is a schematic representation of a data unit.

FIG. 4a is a schematic representation of a data unit 90. The data units include an address field 92, an input field 94, a state or content field 96, and an output field 98. The address 92 uniquely identifies the data unit, both within the information processing device and among multiple information processing devices that may be connected in a network. The input field includes message parameters and identifies other data units that can interact with the data unit and can specify the addresses 100 of the connected data units, time tags 102, and other parameters 104, such as weights and constants, associated with the connections. The input field may also contain past input state data or predicted input state data. The past input data may also contain reset data to reset the NLSP system to a prior state. The state or content field includes data that is one or more functions of the input data and possibly past state data, reset data, or predicted state data. The content field includes parameters that can include a time tag 106, an output value 108 to be propagated through the outputs, and other parameters 110, such as vector or pattern values over different inputs, and vector or pattern values over different outputs. The specific non-volatile values in the content field depend on the specific non-linear stochastic processing algorithm.

NLSP functions usually require that input data units have been updated to a time tag value before the function completes. The content field then acquires the time tag value and the output value is finalized. The output field includes message parameters and identifies other data units that can receive information from the data unit after the function completes and specifies the addresses 112 of the connected output data units. Optionally, although less common in NLSP models, another function may be applied to the outputs, which is neither an input function nor a content function. This may require activations, weights, constants, past and predicted, vector and pattern values, and possibly time tags be stored in the output field for each output unit as well.

The address can be an identifier, which allows message routing to differentiate data units in a device, or in and among a collection of devices. This identifier can also directly include additional information, e.g., about the data unit's connections, or instead it can include a pointer to a table which contains the additional information about routing to the data unit. A processor would then be able to access (or reference) this information indirectly. Using the pointer in the identifier to derive the connection information from the table is referred to as 'dereferencing'.

The components of the data units can be defined by the mathematics of the non-linear stochastic process to be implemented. The stochastic process can be, for example, a connectionist system. In one example, the content field includes data y that can represent a function such as $y=f(w_i x_i + b_i)$, where $w_i$ is a weight, $x_i$ is an input value, and $b_i$ is a constant. If the units represent neuronal data, the units can be activation units that receive information and provide output data to other units. Although the data in a data unit can represent a linear function, when a large number of data units are processed in combination, highly non-linear processes can be implemented.

Components of the data units need not be stored contiguously. The components of the inputs, contents, and outputs could be placed in different parts of the storage device. For example, since, in some NLSP implementations, input and output addresses would not change after being initially established, those components could be stored in an area of the storage media that is separate from that used to store time varying components.

Figure 4B:
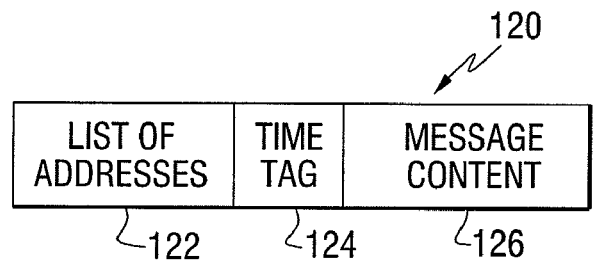
FIG. 4b is a schematic representation of a message.

The device utilizes a messaging framework between the units. Units receive input and are updated. Then messages are sent to other units. The processor forms messages or more directly communicates the new content values to the addressed output data units. FIG. 4b shows a message 120 that includes one or more output data unit addresses 122, an optional update control element such as a time tag 124, and a data unit manipulation parameter that can be for example one or more data values 126 computed by the functions in the data unit. The optional update control element can be a time tag when a marking model type of NLSP process is implemented, or for example, a count value or address list when a spiking model NLSP process is implemented.

In the device of FIG. 3, messaging is implemented by the processor interacting with the high speed RAM. The RAM can be used for caching. Therefore, many data units can be pulled from the RAM, processed through one or more time steps, and kept in RAM to facilitate further processing. For messaging across devices in collections of devices, this can be performed in a hierarchical routing structure.

Figure 5:
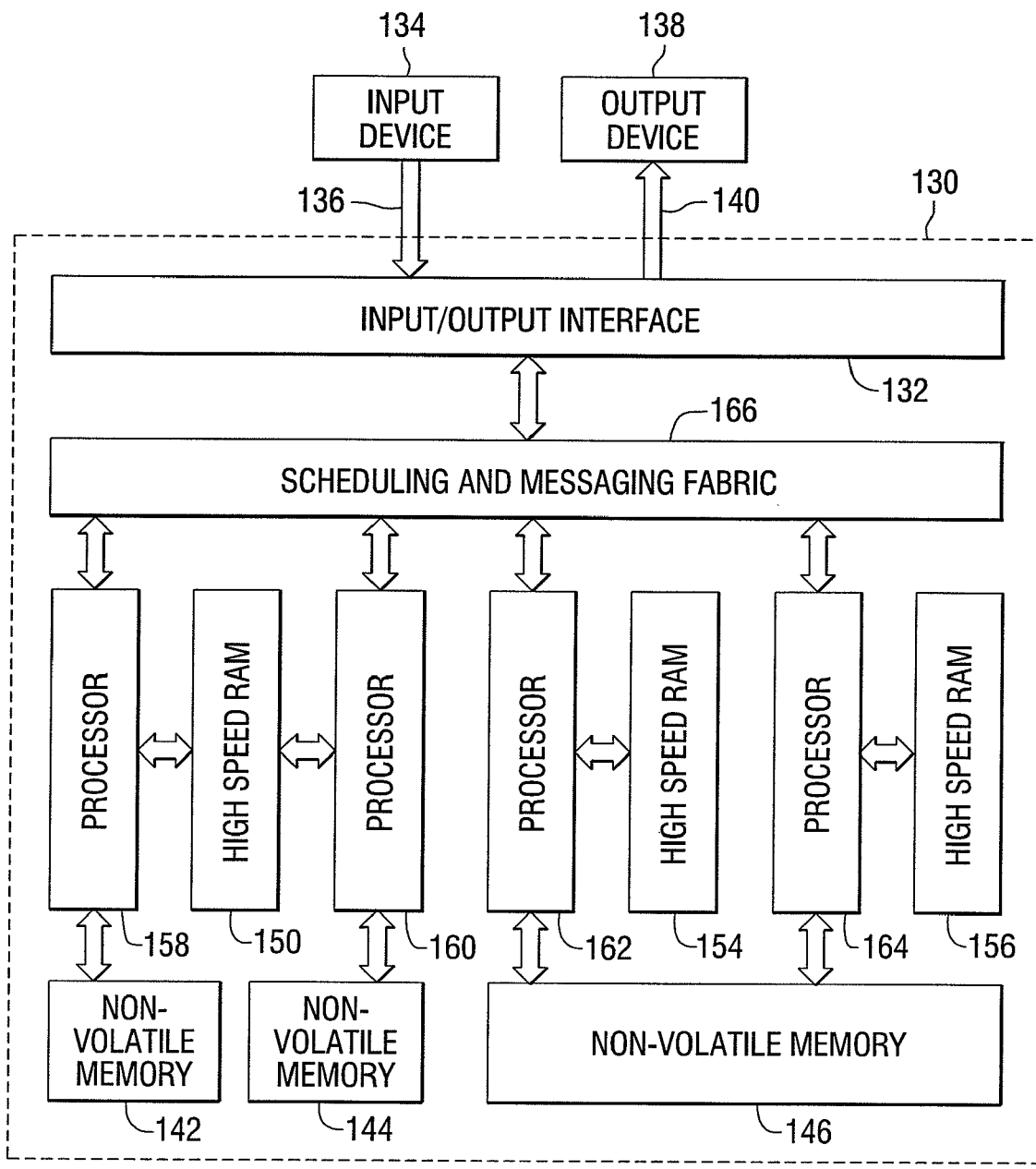
FIG. 5 is a block diagram of another information processing device constructed in accordance with an aspect of the invention.

FIG. 5 is a block diagram of another information processing device 130 constructed in accordance with another aspect of the invention. The device includes an input/output interface 132 for receiving and outputting messages and control commands. In this example, the messages are supplied by an input device 134 on a bus 136 and the messages are sent to an output device 138 on a bus 140. In another example, the input and output messages could be for the same device, and a single bus could be used to transfer the data units. The information processing device 130 includes a plurality of first memory components in the form of a non-volatile memory 142, 144, and 146. Each processor is associated with a single read/write channel to the non-volatile memory, but more than one processor may share the same memory as in 146.

The non-volatile memory provides long term storage of the data units. It can include, for example a magnetic, optical, magneto-optical, or ferroelectric storage media. In those cases, a plurality of transducers would be included in the form of read/write heads that read and write information to the storage media. Alternatively, the non-volatile memory components can be a solid state memory device, or any other type of memory device that provides for long term storage of data units.

The information processing device 130 further includes a plurality of second memory components in the form of a high speed memory 150, 154 and 156, such as a high speed random access memory (RAM). Two or more processors may share the same RAM as in 150. A plurality of processors 158, 160, 162 and 164 are provided for processing the data units in accordance with a desired function. The processors can be implemented as field programmable gate arrays (FPGA), which can be programmed to perform non-linear stochastic processing functions on the data units. In some implementations where the functions applied to the units are fixed, the processors may be comprised of non-field-programmable electronics. The processors can read data units from the non-volatile memory and the high speed memory, process those data units, for example by applying weights to the data units, and write the processed data units to the non-volatile memory. In this example, a scheduling and messaging processor 166 is included to schedule the operations to achieve the desired non-linear stochastic processing functions, for example by coordinating the operation of the processors. The scheduling and messaging processor can take the form of an FPGA scheduling and messaging fabric.

When the units that interact with each other are supervised by the same processor, or are supervised by two processors sharing the same RAM as in 150, then it is not essential that messages be constructed since the data units can be updated directly. But if there is no common storage for the data units, messages are formed and sent across the messaging fabric 166.

Figure 6:
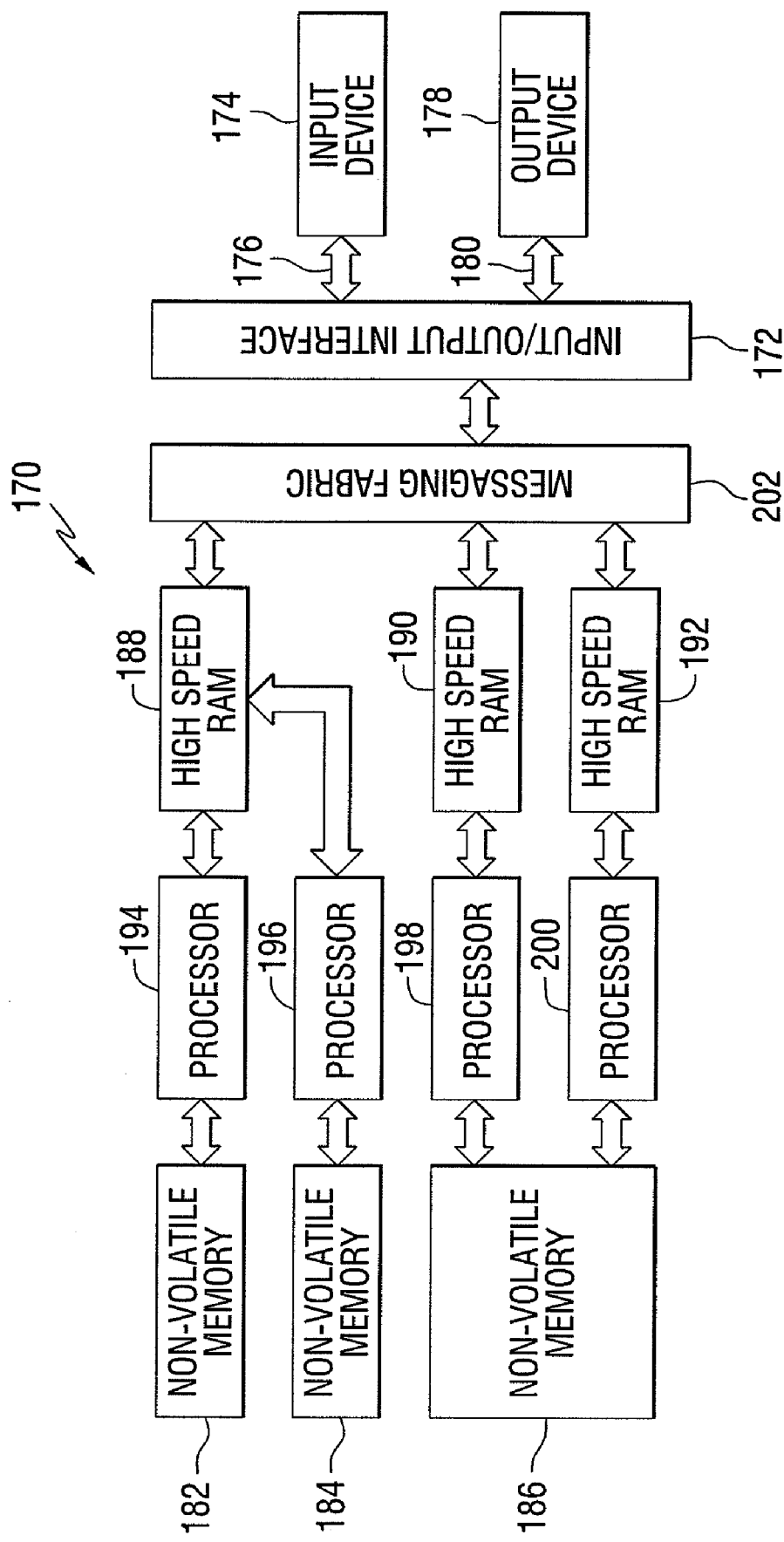
FIG. 6 is a block diagram of another information processing device constructed in accordance with an aspect of the invention.

FIG. 6 is a block diagram of another information processing device 170 constructed in accordance with an aspect of the invention. The device includes an input/output interface 172 for receiving and outputting data units. In this example, the data units are supplied by an input device 174 on a bus 176 and the data units are sent to an output device 178 on a bus 180. In another example, the input and output devices could be the same device, and a single bus could be used to transfer the data units. The information processing device 170 includes a plurality of first memory components in the form of a non-volatile memory 182, 184 and 186. The non-volatile memory components provide long term storage of the data units. It can include, for example a magnetic, optical, magneto-optical, or ferroelectric storage media. In those cases, a plurality of transducers would be included in the form of read/write heads that read and write information to the storage media. Alternatively, the non-volatile memory can be a solid state memory device, or any other type of memory device that provides for long term storage of data units.

The information processing device 170 further includes a plurality of second memory components in the form of a high speed memory 188, 190 and 192, such as a high speed random access memory. A plurality of processors 194, 196, 198 and 200 are provided for processing the data units in accordance with a desired function. In some examples, multiple processors can access a single high speed memory and/or multiple processors can access a single non-volatile memory. The processors can be implemented as field programmable gate arrays (FPGA), which can be programmed to perform non-linear stochastic processing functions on the data units. The processors can read data units from the non-volatile memory and the high speed memory, process those data units, for example by applying weights to portions of the data units, and write the processed data units to the non-volatile memory. A scheduling and messaging processor 202, which can take the form of an FPGA scheduling and messaging fabric, coordinates the operation of the processors.

The information processing devices of FIGS. 3, 5 and 6 are referred to as recognition drives. A recognition drive includes data storage components and additional components that interconnect the data storage components. The recognition drive operates in a manner that is fundamentally different from conventional data storage devices such as disc drives or other byte, block, or object oriented storage devices.

In various aspects, a recognition drive may also be implemented as a novel kind of computing device, device controller, digital camera, digital image processor, digital audio processor, or any of a plurality of other device classes that typically incorporate information processing, such as computers or computing circuitry. For example, a camera could be designed that produces input messages addressing data units stored in the drives, and the output could be messages that classify camera images as to the objects computed in those images. A conventional computer could take those output messages and label the pictures for a database application.

Recognition drives either perform data processing in a highly parallel fashion or simulate the parallelism. Data from a plurality of sources may be multiplexed both in and out and the data can be time stamped if sufficient parallelism is not available to remove any need for such time stamping. In the examples described here, it is assumed that although the electronics are very fast relative to the world events, recognitions, and actions, and that computations performed in the apparatus cannot be completely parallel, so explicit time tagging will be necessary.

Each individual information processing device includes memories that are used to help process a sequence of messages received through the interface. The messages can be produced by a signal source such as a plurality of sensors, or by other information processing devices. The memories can store messages in the form of previously encountered sequences of data units that contain structure. An input sequence of data unit changes may be deemed to contain structure if that sequence of data units has been encountered more than once. An individual information processing device can use the stored sequences of data units containing structure in order to later recognize such structured sequences in a stream of input messages.

In many common NLSP models the input messages have at least two dimensions: a spatial dimension and a time dimension. The spatial dimension constitutes a collection of related signals that are presented for processing to different information processing devices at the same tagged time. These signals are considered to form units of information in the spatial dimension. Over tagged time, different data units are received from different sources. Consecutive messages are closely related in time, and constitute a sequence of different data units.

The spatial dimension and sequence of data units in the time dimension can represent information from numerous different sources. The information in the sequence of data units would generally be highly correlated over time. The correlation of the information is important for learning. Thus, receiving a continual sequence of data units provides a large amount of useful information for learning. Therefore, in many NLSP examples, the apparatus of the present invention would use sequences of data units generated over time as the stream of source information to learn from.

Recognition drives receive a sequence of messages as an input. The processor processes the received input sequence of messages and uses the messages to update the information in one or more of the data units. After several input sequences are processed, the recognition drive can generate a sequence of messages on its output. The output sequence of messages may be passed as an input to one or more other recognition drives, which may be arranged in a layered hierarchy. One layer of recognition drives may receive sensory input from the outside world. The sensory input can also comprise a sequence of messages.

Starting with the data, D, (i.e., a data unit) the time of the real or simulated occurrence of that data is denoted as T. The time parameter T would be incremented when all the inputs to the information processing devices at time T have been summed and a result calculated, sent to, and processed by receptor information processing devices. The summation and calculations can occur in an array of arithmetic logic units implemented in a FPGA where each data unit can represent a multiply/accumulate node with a look-up-table based on a non-linear activation function. T is a global time stamp parameter used to tag input and output data units to preserve the temporal order of data units with asynchronous multi-unit processing.

In one example, T is a discrete integer value. It could be a large number, such as $2^{48}$ where it would, in practice, never come back on itself. By using a large number for T, historical clocking for a recognition drive could be provided. In another example, T could be as small as a single bit, since the T−1 activity must be completed before moving to any activity in time T. A large number is generally preferable so that data units that have not been active for a period of time need not be adjusted constantly for a new T state.

The data unit may include metadata that specifies how source activations combine with current activations and distribute target activations. An activation is the output of the data unit and is typically a non-linear normalizing function or transform of the summation of the input levels.

Logically only output data units are required to be identified, but a list of input data units may be useful for determining if messages are received from all data units in a given T. Alternatively, this function could be performed by a counter. Data units receive inputs or activations from other data units, which are summed until an activation level is reached and the information processing device needs to send an output. In order to send the output, the information processing device would need to know the list of output data units or target data units. Therefore, the network can function without the list of input data units. However, if a particular information processing device wanted to know what fraction of it's input data units are activated, then it could do so with a counter, counting how many inputs it took to reach activation level—assuming it knew how many input connections it had in total.

Optimizations available to the NLSP computations include, but are not limited to, the formatting or placement of the data units in a dataset. An NLSP computation that is a hierarchy of sub-nets, may place highly interconnected data units close to each other in non-volatile storage so that one processor or processors in closely coupled shared RAM can be used to optimize performance.

Other housekeeping and pointer information can be included. To interface a recognition drive with a more conventional storage system, external pointers can be used to identify conventionally stored data. A recognition drive may have a partition, which reads and writes data using conventional storage commands such as ATA or SCSI. In one example, a recognized object may access conventional storage for a database entry on that object. Also, historical information may be recorded conventionally for debugging purposes. Conventional ATA or SCSI commands could also be used to set up, initialize, read out, or copy the data unit networks, and FPGA programs in the NLSP partition of the drive.

An example of parallelism is to load buffers with messages and to go to the next T only when all the messages for a given T have been delivered. In cases where the communications per T are small in number, a single pass over the data units is all that would be needed. In cases where the number of communications exceeds the capacity of a buffer, multiple passes over the data units would be needed. There can be two time stamps in some NLSP models that distinguish between whole sub-net epochs and processing within a sub-net.

To determine switching rates, assume that a mathematical process such as a low order statistical pattern recognition methodology is not preferred. Rather a methodology closer to the brain architecture in terms of non-linearity is desired. However, it is possible to construct sub-nets of cross-connected data units and treat these as units, thereby potentially enabling faster computations.

A known design for NLSP implementations distinguishes a training phase from a trained phase of operation. This may be because some NLSP implementations may take a long time to train because the inputs and desired outputs constitute such a large set, or because they can be over-trained and fail. The pitfalls of over-training can often be avoided by growing the network to compensate against over-training, again leading to performance limitations. However, the present invention has an advantage both in training and trained modes. In a training mode, the weights are typically changed, and this requires that the data unit values, and particularly the weight values in the data units, are updated in the non-volatile memory. In a trained mode, such data unit values do not permanently change so the data unit values are only read from the non-volatile memory. However even in trained mode, some values in the data units may have to be stored. For example time tags in a very large network may be updated to non-volatile storage. In the training mode the advantage is that the necessary data units can be loaded very quickly to the high speed memory for fast execution and only a small part of the data unit need be written back. In the trained mode the advantage is that the necessary data units can be loaded very quickly to the high speed memory for fast execution and possibly no writing to the non-volatile memory need occur.

In one example, the data units can represent neurons. As used in this description, a neuron is not necessarily equivalent to a physiological data unit. For instance, it is known that some firing patterns in physiological neurons are local to parts of the data unit. Such functionality may or may not be specified by the data unit dataset.

The data unit identifier would be unique for each data unit and can include parts that identify routing information for directing messages to and from the data unit. An alternative example could attach a handle to the identifier so that routing information can be efficiently changed. In the example of FIG. 3, it is assumed that the identifier is not indirectly referenced since switching is done locally, without reference to a central dereference mechanism.

Figure 7:
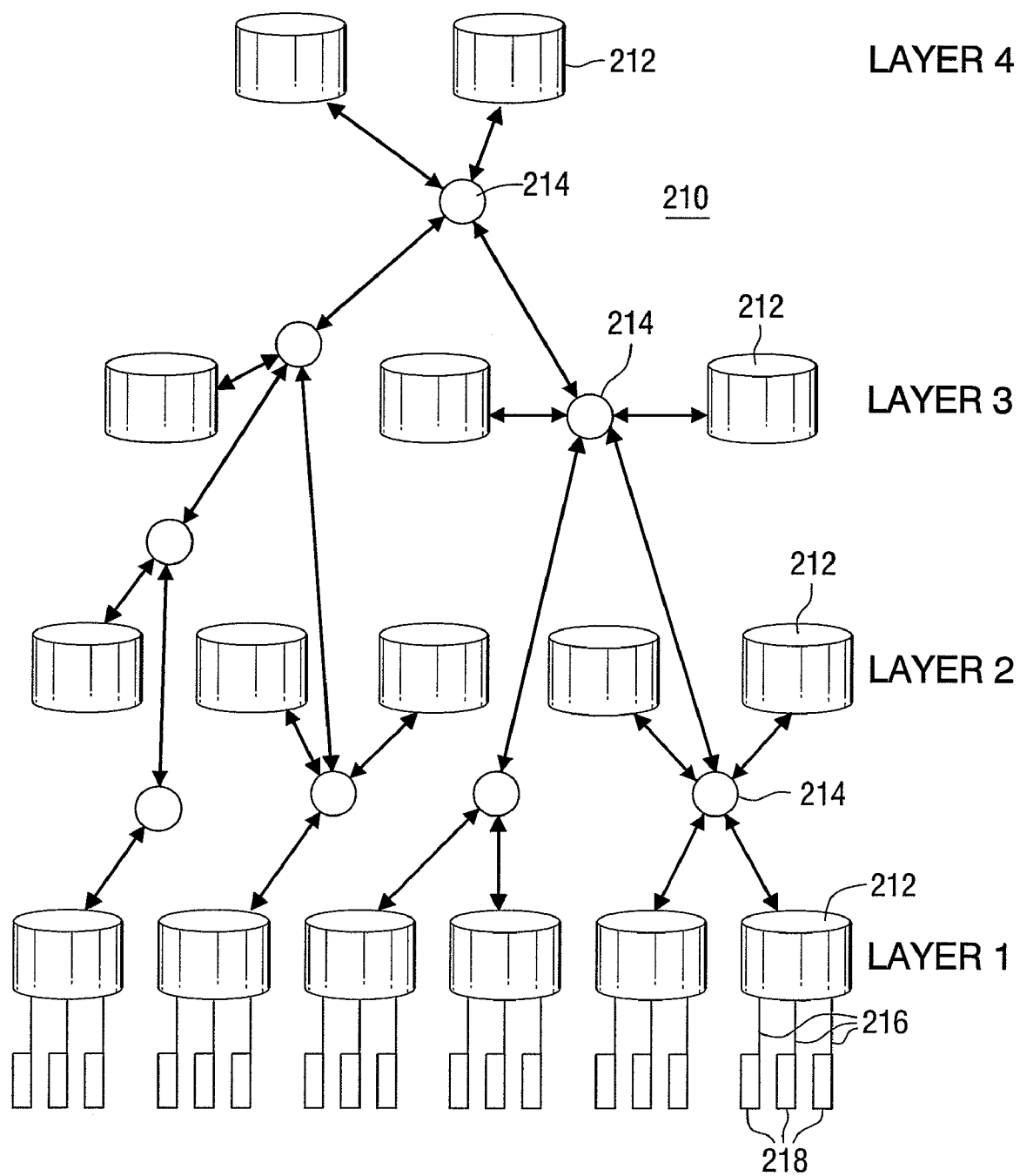
FIG. 7 is a schematic diagram of a hierarchy of connected information processing devices.

FIG. 7 is a schematic diagram of a hierarchy of connected information processing devices forming a recognition drive system 210 that includes a plurality of recognition drives 212 in a network that can be implemented in accordance with another aspect of the invention. The network includes a plurality of recognition drives 212, and a plurality of switches 214. The recognition drives are coupled to each other through the switches. The switches can also be coupled to each other. The network has a layered functional structure. Data can be supplied to the network in input lines 216. This data could be supplied from sensors 218. The switches are controlled by the addresses in the messages. Simple addressing for a data unit includes routing information for a node device in the hierarchy that contains the data unit and the particular non-volatile location of the data unit inside the storage device. Output messages from one drive can address data units in another drive.

Note that FIG. 7 is provided for conceptual explanation purposes. In a practical system, there would likely be more layers and more recognition drives in each layer. With the proper determination of the single algorithm that drives each recognition drive, an intelligent machine may be constructed using the hierarchical architecture illustrated in FIG. 7.

The drives can be synchronized in T. This results in duples {T, D}, such that different data may occur at the same real or simulated time, and/or the same data may occur at different real or simulated times. This way, every drive is told to relate its internal computation to T and does not process messages at T+1 until it has completed producing the output messages for T.

The interconnections among data units and drives are not randomly distributed. Rather, most interconnections cover a short distance, a smaller number of interconnections would connect layers, and only a relatively small number of interconnects would be long distance interconnections. If the recognition drives are arranged in a hierarchy as in FIG. 7, with terminal data input or output being the inputs and outputs of terminal layer drives, then the recognition can be staged across a considerable amount of storage, although the switches that route messages among drives would be outside the drives. As shown in FIG. 7, the arrangement of recognition drives can be provided to build a rich sensory (or input)—motor (or output) system, where Layer 1 includes the raw sensory or motor data units. It should be understood that there is no assumption of number of layers needed in a practical system. The example of FIG. 7 is illustrative only. Other examples could accommodate any number of layers, recognition drives, and switches.

A hierarchy of connected recognition drives can be used to model cognitive function. Nobody actually knows how many data units are in the brain, but taking a common set of estimates, there are about 10 billion data units in the brain, each with between one and ten thousand connections to other data units. Ten thousand is such a small proportion of 10 billion, that it can be assumed that there are approximately 10 billion data units not connected directly in the brain. A recognition drive that models a cognitive function can be considered to be a sparse message switching network.

In this aspect, it is estimated that the recognition drive would need to switch, move, and store about 10,000 messages per T per data unit. Furthermore, the drive would need to process about 10,000 messages per T. The switching infrastructure would then need to be able to handle 10 billion times 10,000 messages per T, or 100 trillion switch operations per T. The duration of T in real time would be less than about 50 milliseconds. A simple binary switching system would suggest that the longest transversal would be about 45 switches times 2, or ninety switches per T.

Each switching circuit in the network would connect to more than one circuit. Assuming a 16-way switch, the number of switches for each time T drops dramatically from 90 to 20. These numbers are within the realm of real time processing, assuming one had enough fast read/write storage for all the data units.

These considerations can be addressed by using a hierarchy of recognition drives. Each information processing device receives sequences of units that must be processed. Each layer of the hierarchy includes recognition drives that receive input in the form of a sequence of data units and also output a sequence of data units since those output units will become the inputs to the recognition drives in the next higher layer. The network may not always include progressively fewer recognition drives on each ascending layer.

When a previously encountered sequence of data units is recognized by a recognition drive, the recognition drive can report such recognition to recognition drives in other layers. The output to the other recognition drives may include an identifier of the recognized data unit sequence. Over time, the output stream containing identifiers of recognized sequences comprises a sequence of data units itself. That output stream of data units may comprise an input that will be processed in a similar manner by the recognition drive in another layer. The outputs of more than one lower layer may be joined together such that the joined outputs form a sequence of data units that may be processed in an upper layer.

A recognition drive may also use a memorized sequence of data units to make predictions about the incoming sequences in order to resolve ambiguous information. Specifically, when a recognition drive determines that it is currently receiving a known sequence, the recognition drive may predict the next data unit to be received in the sequence. The recognition drive may use the prediction to interpret the next data unit received. For example, if the input stream into a recognition drive is ambiguous, then that recognition drive may use the predicted data unit to help identify the next input data unit.

A recognition drive may further provide the predicted next data unit to other recognition drives. The recognition drives that receive the prediction may interpret this as a prediction of the next sequence that those recognition drives will encounter, and hence output to other drives. Such prediction information may comprise information that helps the other recognition drive layers to correctly identify the next sequence.

The system can be used to create invariant representations of objects in a world with which the recognition drive interacts. An invariant representation is an internal representation of an object (e.g., a physical object, a word, a song, etc.) that allows later recognition of the same object under different external conditions.

The system assumes that an invariant representation of an object can be constructed by using a hierarchy of recognition drives. The invariant representation is formed by identifying invariant structure within the constantly changing sequence of data units and storing that invariant structure so that it may later be recognized. Each recognition drive performs this process of identifying, storing, and later recognizing invariant structure at other levels in the hierarchy. Thus, the overall invariant representation of an object comprises the invariant structures associated with that object that have been stored in a set of hierarchically arranged recognition drives. An invariant representation includes invariant structures at many different levels. These different levels of invariant structures (including the entire invariant representation structure) can be used within the invariant representations of other objects.

The memory in each recognition drive can be used to store invariant structures that have been located in the incoming sequences of data units. In this manner, the stored invariant structures may later be recognized in the incoming sequence of data units in order to recognize objects that include invariant structures.

Repeated data units and repeated sequences of data units are likely to be part of an invariant structure. In one example, each recognition drive may search for repeated data units or repeated sequences of data units in the input stream in order to identify invariant structures contained within the input stream. The recognition drive may then store those repeated data units and repeated sequences of data units in memory for later recognition.

Upon recognition, a recognition drive may pass up a sequence identifier, or name, for the recognized sequence of data units to the next higher layer in the hierarchy. As long as the incoming sequence of data units continues to match the memorized sequence of data units, the recognition drive will continue to output the same sequence identifier for that recognized sequence of data units. Since the same sequence identifier is being output during the entire unit sequence, the higher layers will have recognition drives that switch less frequently than lower recognition drives.

Each recognition drive stores sequences of data units in memory for later recognition. If the incoming data units match a particular memorized sequence, then the information processing device recognizes that particular sequence and informs the coupled recognition drives in higher layers that a known sequence is being observed.

This sequence recognition can also be used to make a prediction. Specifically, if a recognition drive recognizes that it currently contains a known sequence of data units, then that recognition drive may determine the next data unit that the recognition drive expects to receive by identifying the next data unit in the recognized sequence of data units. This next expected data unit constitutes a prediction by the recognition drive.

The next data unit prediction may also be passed between different recognition drives. FIG. 7 illustrates the different hierarchical layers with information flowing both upwards and information flowing downwards. Each individual recognition drive attempts to identify invariant structure in its input stream. When a recognition drive recognizes a memorized sequence of data units, information about that recognition (e.g., an identifier for the recognized sequence) is passed upward to a higher recognition drive layer. Information about failed predictions may also flow upward. The downward information flow may include next data unit predictions made by recognition drives higher in the hierarchy that are passed to lower recognition drives.

The collective memory of invariant structures learned by the hierarchy of recognition drives comprises an invariant representative model of the surrounding world. Feedback or information flowing down the hierarchy serves a number of functions. The feedback information can be used to resolve ambiguous input data. The feedback information may also be required for learning. As recognition drives learn sequences of data units, that recognition drive learns the sequences in a particular context that is provided by the next higher recognition drive. The context specifies a state of the higher recognition drive. The context may be specified as the current component of a sequence being experienced by that higher recognition drive. This context feedback information provides a means for the recognition drive to properly group its input data units together.

The behavior of a system of recognition drives can be organized over fewer or more recognition drives since data unit processing is isomorphic between and within drives. The processing on one sub-net of data units need not be the same functions as on another sub-net, and the messages interpretable by one sub-net need not be the same as the messages interpretable by another sub-net, although the message format, addressing, and content must be correct for the input and output data units.

Assuming the entire data unit network resides on one highly capable recognition drive, we can see how this drive operates in a given world and optimizes behavior in that world against goals enforced by changes induced in that world by the recognition drive and by external agents. External agents effect change in the world that are not directly controlled by the recognition drive, but operate consistently within the invariants of the world in question. The recognition drive attempts to change the world or induce the external agents to change the world to a state where the sensory inputs can be accounted for in terms of high-level invariants. In effect, the recognition drive seeks to perfectly account for, and modify, its perceived environment.

An output from a recognition drive can change the inputs it receives. For example, if the output controls a motor and the motor is moving a robot with a camera attached, the output could cause the robot to move toward a person. As the motion toward a person occurs, the person may move. A special output mode of a recognition drive may be to submit moment-to-moment recognized invariants to conventional deductive reasoning processes so that the goals of the recognition drive could change with time. In this sense there may be an additional input-output interface to the drive that provides a connection to a conventional computer. However, this other interface may not be needed if one class of actions is to communicate with an external agent with a description of what the recognition drive is seeing and what it is trying to do.

The problem that the recognition drives would be trying to solve would partly determine the total storage needed. However, assuming that the required storage is 100 terabytes for 1 billion data units inside the recognition drives, then each drive would allow a data unit to have about 100,000 bytes of potentially permanent memory, although part of that memory would likely be constantly overwritten in practice. Assuming a data unit pointer controls routing and is 64 bits, then 10,000 pointers could be stored in 80 KB. It seems reasonable to expect a data unit could fit within 100 KB or perhaps 200 KB. At one terabyte per drive, 100 KB data units require 100 recognition drives.

It is widely accepted that at any given time, only a small percentage of neurons in a neural network are active. In the examples described below, assume that 1% of the neurons are active.

The table below shows some example design parameters and compares the storage and performance of several examples of recognition drive systems to an example where conventional disc drives would be configured to perform the same computations. The basic differences from the example just given are that this table assumes 10 billion data units and about 125 KB per data unit (i.e., a million bits of storage). The total storage required in this example is about one Petabyte. It is readily apparent that data unit computations are infeasible using conventional disc drive technology, because it would require millions of disc drives to do what 1000 recognition drives could plausibly do.

| | Recognition Drive Design Parameters | | | |
|---|---|---|---|---|
| | Conventional Disc Drives | 10,000 recognition drives | 1,000 recognition drives | 100 recognition drives |
| Number of Data Units | 10,000,000,000 | 10,000,000,000 | 10,000,000,000 | 10,000,000,000 |
| R/W Bits Per Second Per Head | 1,000,000,000 | 2,000,000,000 | 2,000,000,000 | 2,000,000,000 |
| Size of Data Unit in Bits | 1,000,000 | 1,000,000 | 1,000,000 | 1,000,000 |
| Number of Drives | 4,166,667 | 10,000 | 1,000 | 100 |
| T in Seconds | 0.05 | 0.05 | 0.05 | 0.05 |
| R/W Bits Per T | 50,000,000 | 100,000,000 | 100,000,000 | 100,000,000 |
| Percent of Data Units in Each T | 1% | 1% | 1% | 1% |
| Heads Per Drive | 24 | 100 | 1,000 | 10,000 |
| Data Units Per Drive | 2,400 | 1,000,000 | 10,000,000 | 100,000,000 |
| Drive Capacity (Bytes) | 300,000,000 | 125,000,000,000 | 1,250,000,000,000 | 12,500,000,000,000 |
| External 16 Way Switch Depth | 6 | 4 | 3 | 3 |
| External Number Switches | 277,781 | 667 | 67 | 7 |
| Internal 16 Way Switch Depth | 2 | 3 | 3 | 4 |
| Internal Number Switches | 2 | 7 | 67 | 667 |

60

In the example of FIG. 7, the Layer 1 drives could be divided by a gross function. For example, some drives may be restricted to accepting visual data, some to auditory data, some to motor effectors, etc. Then learning would be isolated in different sensory motor domains.

Conventional disc drives are mixes of digital and analog components, so the distinction between digital and analog is not fundamentally relevant here, but rather an engineering convenience. The recognition drive or a system including recognition drives need not be digital, or in fact have any digital components, although it may be wholly digital or a mix of digital and analog components.

Recognition drives and networks of such drives can be used to process data in many applications. A candidate reference application might include a surveillance system including a multi-eyed device with eye movement and focus control, and multiple microphones in an environment where the objective is to describe events happening in a room. The device might be subjected to multiple actions including, for example, moving the eyes, perhaps adjusting the microphones, and communicating in simple English. An external agent can be provided to reward or punish correct or incorrect interpretations of the events occurring in the room. The communication function could be implemented in simple, template English that is not subject to feedback control (e.g., that part of the action output would not be integrated as part of the recognition drive).

However, recognition drives do not have to operate at human scales or perform animal-like activities to be useful. For example, in data searching operations, the problem first mentioned for conventional drive storage, the input to the recognition drive would be files in a file system. An example would be video files. In this case the recognition drive may recognize actions. Then metadata space in the data units would index these actions back to the original file data on conventional disc drives. In this example, the system would use machine induction to find precise data.

Finally, the world being learned need not be a human scale or type. Very small or very large worlds could be stored for recognition and action. The sensory inputs could be inputs not sensible to humans, such as electromagnetic radiation at frequencies outside of visible light, and the outputs could effect actions that humans cannot directly perform. Many more applications are possible and apparent.

Another difference between a conventional storage device and a recognition drive can be illustrated in terms of its inputs and outputs. A conventional storage device is a slave that reads and writes data, although more sophisticated ones could receive and respond to messages. The recognition drive is intended to directly take sense input, such as camera input, input from microphones, temperature input, gyroscopic input, or any type of digital or analog input that is a source of invariances, and to use its previously stored memories to organize that input. Based on what it recognizes, it responds with digital or analog outputs that can control behaviors, such as naming or describing, or perhaps controlling speakers, displays, and motors.

The recognition drive, in this sense, behaves much more like an intelligent brain, than a computer storage device. More generally, both the sense data and the action data can be thought of as tagged byte data, where the tagging is relevant to the organizational input and output dimensions on which the data may be organized for the purposes of memory recognition and consequent actions.

Between the input and the output, a recognition drive will learn to be good at discovering and using world invariants. One can expect it to first recognize such invariants, and then recognize what to do about their presence or their sequences of manifestations. The actions are themselves composed of invariances that can change a sensed state of affairs based on general goals. The output should be able to change the input in ways predicted by the recognition and action. Goals could include moving cameras to follow people in a surveillance system, directing mobile robots, or more esoteric systems such as making better beer, or refining descriptions.

The recognition drive is not a statistical pattern recognition device in the traditional sense. Such a device, at least as statistical pattern recognition is understood today, is more efficiently implemented in a conventional computing framework. A recognition drive uses NLSP and can discover invariants of much higher dimensionality than is practical with conventional statistical pattern recognition, and can act with much higher dimensionality than is practical with conventional response systems (e.g., printers, motors, graphical displays).

In one example, a recognition drive can be produced by modifying conventional drive technology for recognition and motor action. The basic mechanisms of a recognition drive require a lot of reading and writing to storage. But to address this problem, storage has a short-term and a long-term component, and also a local and distal topology. The interfaces may be conventional or custom depending on the worlds in which the recognition drive is intended to operate.

A useful policy in a recognition drive is that sense data to it would be raw, and action data from it would be raw. This means that the recognition drive would have the ability to modify even the lowest levels of invariance detection and production. Take the example of an edge detector in a camera system. Such a detector takes as input raw pixel data and identifies edges of high gradient changes in intensity, hue, and saturation. It may be that the raw data contains both the original image and the edge image, but then there will be no opportunity for the recognition drive to change the computations for finding the edges. That is, there would be no awareness of the edges, as edges that can be perceived differently based on different goals. The kind of action data that is processed inside the drive, versus outside the drive, is similarly constrained.

The recognition drive can be implemented using various mechanical configurations: including flat and cylindrical configurations. Various configurations of read/write heads and associated electronics and firmware can also be included.

Figure 8:
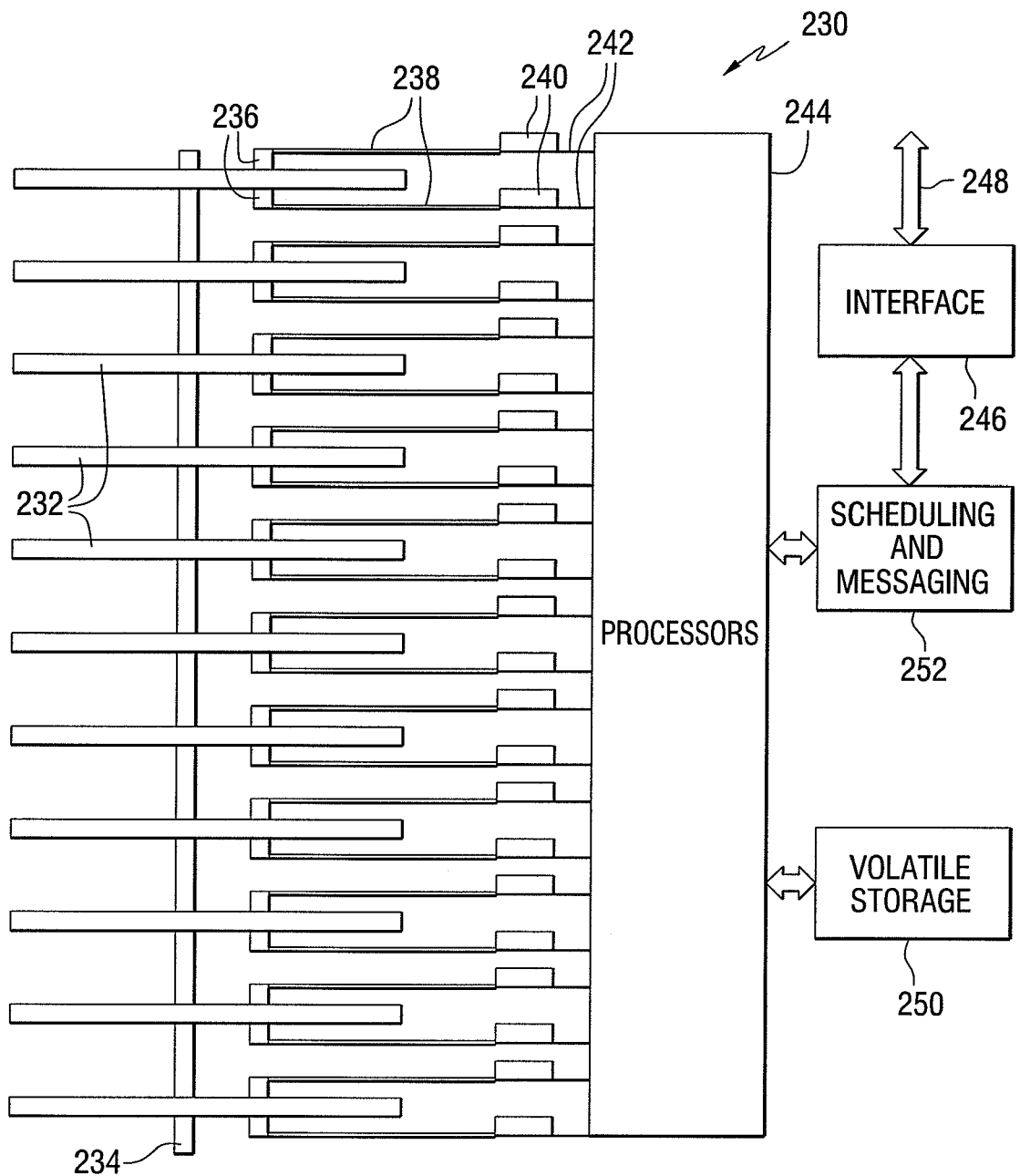
FIG. 8 is a schematic representation of another information processing device constructed in accordance with an aspect of the invention.

In one example, the invention can be implemented in a data storage device in the form of a disc drive, wherein there is a rotating non-volatile storage media with one or more read/write heads on one or more armatures. A multi-platter configuration can utilize disc drive technology including many discs or platters, with a transducer in the form of a read/write head for each platter side. One example disc drive 230, illustrated in FIG. 8, includes 12 platters and 24 read/write heads. A plurality of discs 232 are connected to a drive spindle 234 that controls the rotation of the discs. Each disc includes non-volatile storage media. A plurality of transducers 236 are mounted on actuating arms 238 and positioned adjacent to the storage media. Each transducer can be a read/write head, which may actually contain separate heads for reading and writing as is common in magnetic recording technology. The actuating arms position the transducers adjacent to tracks on the discs and are controlled by actuators 240. Data to be written to, or read from, the storage media is transmitted on lines 242 by a plurality of processors 244. The processors include hardware and firmware that controls the reading and writing of data to the storage media and processes the data units using a non-linear stochastic process. An interface 246 is provided to input information to, and output information from, the disc drive on bus 248. A high speed volatile storage component 250 is provided for temporary data storage. A scheduling and messaging processor 252 is included to coordinate operation of the processors. To perform as a recognition drive, the processor electronics and firmware would be constructed and arranged to perform the functions described herein.

Other configurations can be used in place of a conventional rotating disc configuration, principally to allow many more heads per drive, and to reflect the fact that the probable data size of any given data unit would be fixed. Therefore, read/write tracks that are sized to accommodate an integer number of data units would allow for improved opportunities for efficiencies in computation.

Figure 9:
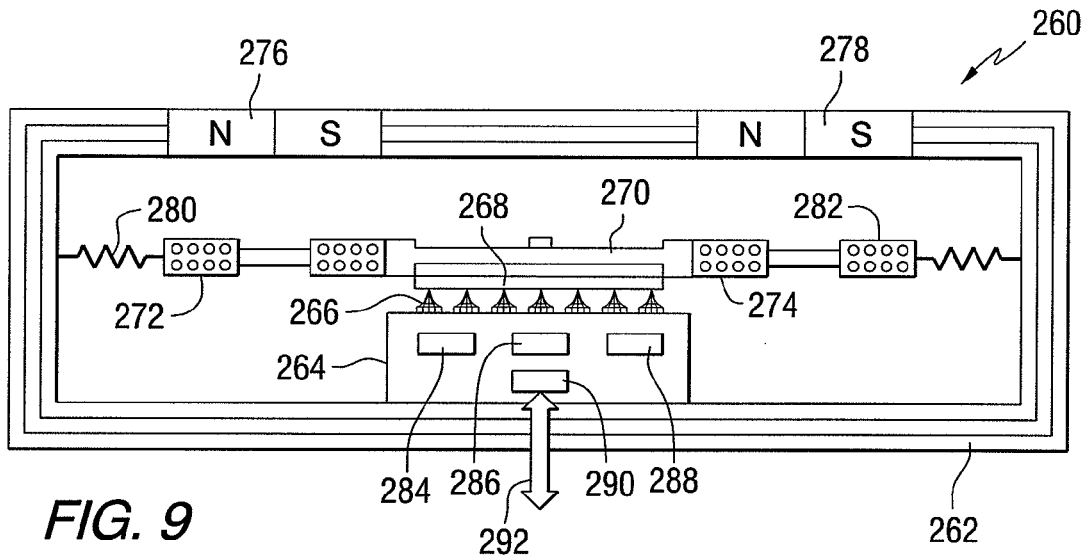
FIG. 9 is a schematic representation of another information processing device constructed in accordance with another aspect of the invention.

A flat configuration that can be implemented as a probe type storage device is illustrated in FIG. 9. Many read/write heads can be created using MEMs processes on a chip and these heads could read/write data on a non-volatile storage media having a flat surface by movement of the heads or media in X and Y directions in a plane. FIG. 9 is a cross-sectional view of a probe storage device 260. The device includes an enclosure 262, also referred to as a case, base, or frame, which contains a substrate 264. An array of probes 266 is positioned on the substrate. The probes extend upward to make contact with a storage media 268. The storage media 268 is mounted on a movable member, or sled 270. The storage media can be, for example, a magnetic, optical or ferroelectric storage media. The destructive readout characteristic of ferroelectric storage media would not be detrimental in a recognition drive. Some types of memory devices employ a destructive readback mechanism for various reasons such as cost/simplicity in DRAM and signal-to-noise in some implementations of ferroelectric media. This is fine for a recognition drive architecture, where reads of media are followed by modify and re-write processes, and there is no need to have random multi-read access.

In the example of FIG. 9, relative movement between the storage media and the probes is provided by an electromagnetic actuator that includes coils and magnets. Coils 272 and 274 are mounted on the movable member. Magnets 276 and 278 are mounted in the enclosure near the coils. Springs 280 and 282 form part of a suspension assembly that supports the movable member. The enclosure 262 can be formed of, for example, injection molded plastic.

One or more processors 284, scheduling and messaging processor 286, a high speed volatile storage component 288, and an interface 290 could be mounted within the enclosure. In the example of FIG. 9, these items are mounted in the substrate While FIG. 9 shows one example of a probe storage device, it will be recognized that other known types of suspensions and actuators can be used to position the components and to provide relative movement between the probes and the storage media. This invention is not limited to devices that use any particular probe and media positioning and/or actuating devices.

Data to be written to, or read from, the storage media is transmitted on a bus 292 to the processors 284. The processors 284 can include hardware and firmware that controls the reading and writing of data to the storage media and also controls the switch matrix. The interface 290 is provided to input information to, and output information from, the storage device on the bus 292. The volatile storage component 288 is provided for temporary data storage. To perform as a recognition drive, the processor electronics and firmware would be constructed and arranged to perform the functions described above.

Figure 10:
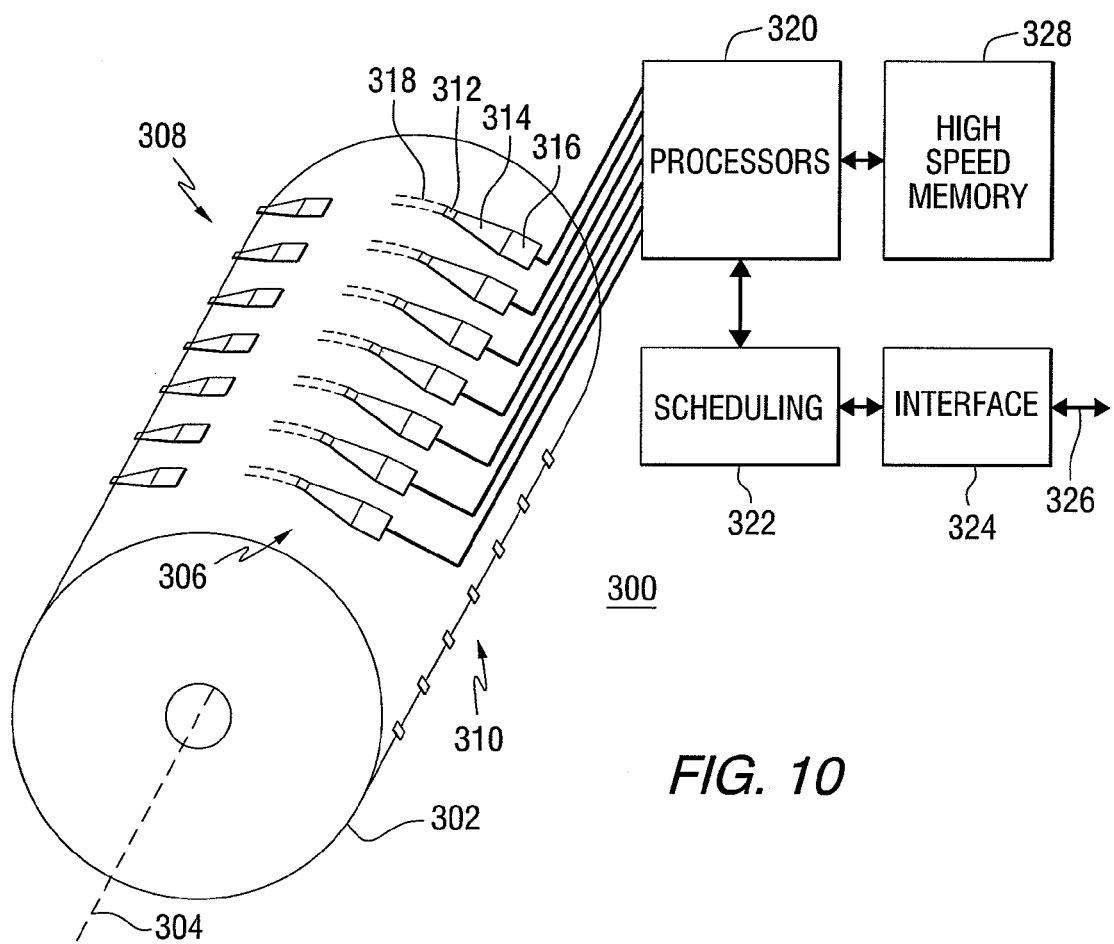
FIG. 10 is a schematic representation of another information processing device constructed in accordance with another aspect of the invention.

Another example of a data storage device uses a rotating cylinder configuration 300, illustrated in FIG. 10. This example uses a cylindrical storage medium 302 that is structured and arranged to rotate around an axis 304. A plurality of transducer arrays 306, 308 and 310 are positioned adjacent to the surface of the storage medium. Each of the transducer arrays includes a plurality of transducers 312 mounted on arms 314 that are controlled by actuators 316. The actuators move the arms to position the transducers adjacent to tracks 318 on the storage medium. The transducers are connected to a plurality of processors 320. A messaging and scheduling processor 322 controls reading and writing operations of the transducers and also controls the operation of switches in the switching matrix. An interface 324 is used to input information to, and output information from, the drive via a data bus 326. A volatile storage component 328 is provided for temporary data storage.

The configuration of FIG. 10 includes a plurality of read/write heads, including several arrays of heads positioned along the surface of the cylinder. Heads mounted in this arrangement can read and/or write the data several times in a single revolution of the cylinder. The cylinder or heads can also be moved to read/write different tracks. A single data unit may lie on only one track, and a single track may contain a plurality of data units.

In one example, four arrays of heads positioned around the cylinder would allow the read/write operations to be sequenced. The device does not require four head arrays; it could be one, six, or any practical number. However, the distribution of data unit data should be optimized so that the heads are reading or writing as frequently as possible.

A rotating cylinder recognition drive can include a large number of read/write heads. The cylinder can be relatively compact, and the motions of spinning the cylinder and moving the heads to different tracks would be relatively easy to control. The outside of the cylinder can be coated with a storage media, that can be for example a magnetic, optical or ferroelectric material. The cylinder could be any diameter and could be a rod. A two-inch diameter cylinder that is three inches long could store about a Terabyte at currently demonstrated magnetic recording densities.

Each of the example recognition drives can read and write data in parallel and can move data between data units. The processors allow for switching data between data units. Subsets of data units would be highly interconnected. Therefore the processors should be able to cross-connect data units. Other connections between cross-connected subsets of data units can provide layered connections of data units. Additional connections, including attentional connections and learning connections, can be provided to connect to distant cross-connected and layered data units. Attentional and learning connections simply provide activations of attentional and learning control data units. Futhermore, the NLSP systems can be designed that can include the ability to add and delete connections. The creation and deletion of connections at will may lead to performance efficiencies.

Figure 11:
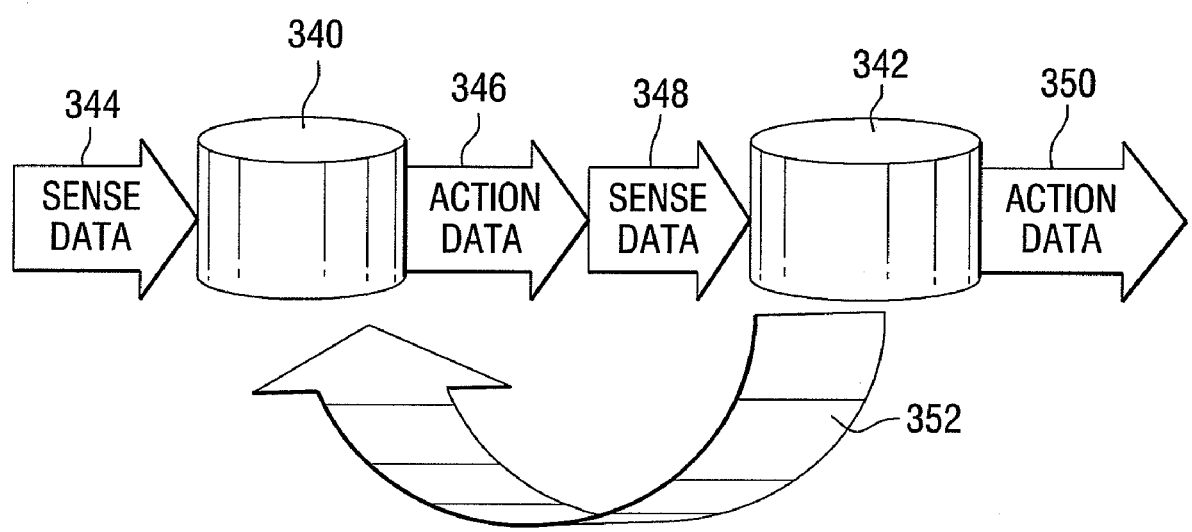
FIG. 11 is a schematic diagram of information processing devices connected in series.

It is possible to string together multiple recognition drives without loss as shown in FIG. 11. The outputs of recognition drive 340 serve as inputs to recognition drive 342. Sense data 344 is received by recognition drive 340 and processed to produce action data 346. This action data becomes sense data 348 for recognition drive 342, which uses it to produce action data 350. Arrow 352 indicates that the outputs of recognition drive 342 are fed back to recognition drive 340. In this case, each drive's sense inputs are partly composed of other drive's action outputs. Combining many physical recognition drives in this way does not violate the computational needs of a single drive as long as feedback actions are wired. A hierarchy of drives would be possible if separate sense modalities, e.g., separate motor/action subsystems, are controlled. For example, a first drive could be used for low level visual invariance recognition and a second drive for low level auditory invariance recognition. The benefit of a series is that drives may be specialized for different functions. One drive may take camera input and label the scenes. The second drive may take labels and develop English or other language descriptions from the labels.

It is also possible, with more complex switching arrangements, to assemble drives in practical hierarchies, more closely approximating the natural (i.e., world invariant preserving) separations of processing found in the animal neocortex. Such switched combinations of recognition drives form recognition drive systems.

The foregoing has described methods, architecture, and apparatus for implementing machine intelligence as one or more storage devices. It is contemplated that changes and modifications may be made to the components and arrangements of components without departing from the scope of the invention. For example, the recognition drives may include 'racetrack' memory which is a solid state technology where magnetic domains are established along the length of a nanowire and nanoscale magnetic pulses are used to move the domain wall boundaries past a sensor. Data is encoded as the absence or presence of a domain wall, and these walls are made to propagate serially around the wire, with a spatial pattern intact.

The implementations described above and other implementations are within the scope of the following claims.

What is claimed is:

1. An apparatus comprising:
a mass storage device including an interface for receiving and outputting messages for processing data units defined by mathematics of a non-linear stochastic process to be implemented, wherein each data unit includes an input field including input data and an identifier that uniquely identifies the data unit, message input field parameters including a list of identifiers that uniquely identify other data units that can interact with the data unit, message output field parameters, a time tag, and content field parameters including data that is a function of the input data; a non-volatile memory; a volatile memory; and a processor coupled to the interface for manipulation of the parameter values in the data units to achieve non-linear stochastic processing functions and storing the data units in at least one of the non-volatile memory and the volatile memory.

2. The apparatus of claim 1, wherein the identifier includes a pointer to a table that contains additional information about routing to the data unit.

3. The apparatus of claim 1, wherein the processor updates the data units based on received input messages from other data units and sends messages to the other data units.

4. The apparatus of claim 1, wherein the processor updates the data units based on received input messages from other processors and sends messages to the other processors.

5. The apparatus of claim 4, wherein the data units are updated in a first time interval, and updated units are stored prior to moving to a second time interval.

6. The apparatus of claim 1, wherein the received messages include at least an identifier that uniquely identifies the received message and an update control element.

7. The apparatus of claim 1, wherein the processor comprises:
a field programmable gate array.

8. The apparatus of claim 1, wherein the data units are initialized to fixed values.

9. The apparatus of claim 1, wherein components of the data units are stored in the non-volatile memory non-contiguously.

10. An apparatus comprising:
a mass storage device including an interface for receiving and outputting messages for processing data units defined by mathematics of a non-linear stochastic process to be implemented, wherein each data unit includes an input field including input data and an identifier that uniquely identifies the data unit, message input field parameters including a list of identifiers that uniquely identify other data units that can interact with the data unit, message output field parameters, a time tag, and content field parameters including data that is a function of input data; a plurality of non-volatile memories; a plurality of volatile memories; a plurality of processors for manipulation of the parameter values in the data units to achieve non-linear stochastic processing functions and storing the data units in at least one of the non-volatile memories and the volatile memories; and a scheduling and messaging fabric coupled to the processors to coordinate operation of the processors.

11. The apparatus of claim 10, wherein the identifier includes a pointer to a table that contains additional information about routing to the data unit.

12. The apparatus of claim 10, wherein the processors update the data units based on received input messages from other data units and send messages to the other data units.

13. The apparatus of claim 10, wherein the processors update the data units based on received input messages from other processors and send messages to the other processors.

14. The apparatus of claim 13, wherein the data units are updated in a first time interval, and updated units are stored prior to moving to a second time interval.

15. The apparatus of claim 10, wherein the input messages include at least an identifier that uniquely identifies the input message and an update control element.

16. The apparatus of claim 10, wherein each of the processors comprises:
a field programmable gate array.

17. The apparatus of claim 10, wherein the data units are initialized to fixed values.

18. The apparatus of claim 10, wherein components of the data units are stored in the non-volatile memories non-contiguously.

19. The apparatus of claim 10, wherein the processors perform computations on the data units without formatting the data units in messages.

20. The apparatus of claim 10, wherein the non-volatile memories comprises a cylindrical storage media.

21. An apparatus comprising:
a plurality of mass storage devices, each including an interface for receiving and outputting messages for processing data units defined by mathematics of a non-linear stochastic process to be implemented, wherein each data unit includes an input field including input data and an identifier that uniquely identifies the data unit, message input field parameters including a list of identifiers that uniquely identify other data units that can interact with the data unit, message output field parameters, at least one of a time tag or count value, and content field parameters including data that is a function of input data; a non-volatile memory; a volatile memory; and a processor coupled to the interface for manipulation of the parameter values in the data units to achieve non-linear stochastic processing functions and storing the data units in at least one of the non-volatile memory and the volatile memory; and
wherein the mass storage devices are coupled to each other in a hierarchical message routing structure.

* * * * *